Oct. 18, 1938.   G. A. SCHIEREN   2,133,720
BELT JOINER
Filed Dec. 10, 1937
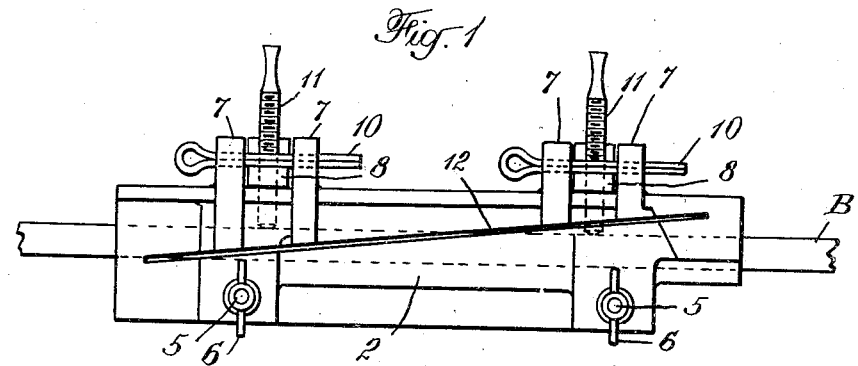
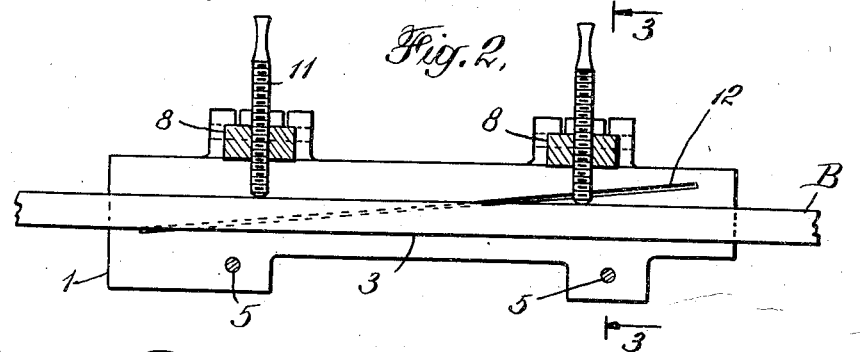
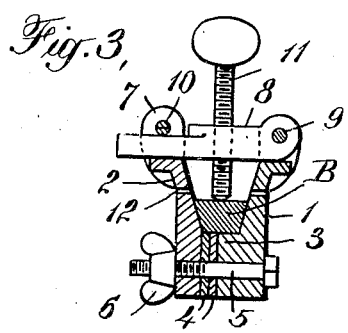
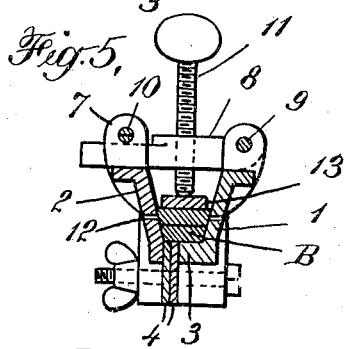
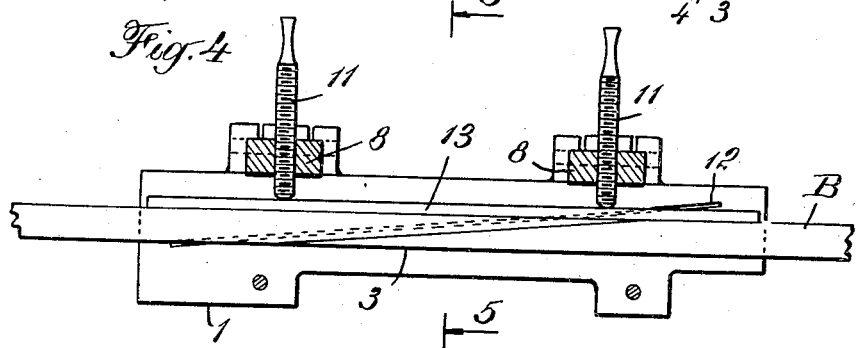
INVENTOR
G. Arthur Schieren
BY
Pennie, Davis, Marvin & Edmonds
ATTORNEYS Patented Oct. 18, 1938

2,133,720

UNITED STATES PATENT OFFICE 2,133,720

BELT JOINER

George Arthur Schieren, Great Neck, N. Y., assignor to Chas. A. Schieren & Company, New York, N. Y., a corporation of New York Application December 10, 1937, Serial No. 179,127

4 Claims. (Cl. 69—1)

This invention relates to apparatus for joining leather belts and more particularly to an apparatus for cutting a V belt and for holding two ends of a belt after cementing in the operation of splicing.

An object of the invention is to provide an apparatus suitable for use with various size V belts and for that purpose I provide a frame having a pair of inclined side walls and having a base which may be adjusted for the reception of belts of different sizes. With the apparatus properly adjusted for a given size belt, the belt may be clamped therein and firmly held.

I further provide means for forming the inclined or bevelled ends normally used in splicing leather belting. Each of the side walls is provided with a slot which is adapted to receive and guide a cutting implement, such as a hack saw. With a piece of belting properly clamped in position it may be readily cut and the guiding means enables belting to be cut in such manner that the bevelled ends to be cemented to each other in splicing of belts are uniform. The apparatus is further useful as a clamping means when two belt ends have been cemented. The cemented portions are then placed in the apparatus and clamped firmly while the cement dries.

In the accompanying drawing I have shown one embodiment of the invention. In this showing:

Fig. 1 is a side elevation with a piece of belting in position for cutting;

Fig. 2 is a vertical, longitudinal, sectional view;

Fig. 3 is a vertical, transverse, sectional view on line 3—3 of Fig. 2;

Fig. 4 is a vertical, horizontal, sectional view showing two ends of belting clamped in position during the splicing operation and showing a template in position over the belting; and Fig. 5 is a vertical, transverse, sectional view on line 5—5 of Fig. 4.

Referring to the drawing the apparatus comprises a pair of side members 1 and 2, each of which is inclined at an angle equal to the inclined edges of V belting. The side member 1 carries a base portion 3 which is of sufficient width for narrow belting so that when the side members 1 and 2 are clamped together, a narrow piece of V belting may be arranged in the trough formed by these members. To permit adjustment of the apparatus for belts of greater width, I provide a plurality of shims 4 which are adapted to be arranged between the two side members beneath the base portion 3. These side members may be connected to each other by any suitable means and in the drawing I have shown a bolt 5 arranged adjacent each end of the apparatus passing through aligned openings in the side members and in the shims 4 and provided with a wing nut 6 for clamping the side members together.

The belt is adapted to be clamped in the trough formed by the side members by means of threaded bolts. As shown, the side members are provided with pairs of aligned ears 7 adjacent each end. A cross member 8 is pivotally mounted on a pin 9 carried by the pair of ears on one of the side members and is adapted to be received between the cooperating pair of ears on the other side member. When the cross member is in position, a cotter pin 10 or the like is inserted in openings in the second pair of ears to retain it in position. A bolt 11 extends through each of the cross members and is adapted to be screwed down against the upper surface of the belt B when a piece of belting is arranged in the apparatus for cutting.

As shown each of the side members is provided with an inclined slot 12, the slot being inclined at the angle normally used in cutting the ends of leather belting for splicing. A hack saw or other suitable instrument is passed through the slots adjacent their upper ends and then travels down the slot to perform the cutting operation. If the bolt 11 is in a position where it interferes with the cutting operation, as in Fig. 2 of the drawing, it may be loosened and removed from the path of the saw, the other bolt 11 serving to hold the belt sufficiently for this cutting operation. It will be apparent that the apparatus provides uniform ends for splicing and therefore permits the user to obtain better splices than if the ends of the belt are cut without guiding means and unequal angles obtained as a result. When two pieces of belt have been cut to provide the desired angular portion at the end and are to be united, cement is applied to them in the usual manner and the cemented ends are arranged in the apparatus as shown in Figs. 4 and 5 of the drawing. The belt is firmly clamped in the apparatus and left there until the cement dries. During this operation to obtain distribution of pressure over the entire cemented portion, I preferably place a template 13 over the joined ends of the belting and bring the bolts 11 into engagement with it as shown in Figs. 4 and 5 of the drawing.

The advantages of the apparatus are obvious. By adjusting the spacing of the side plates 1 and 2 by means of the shims 4, the apparatus may be made to accommodate V belting of various widths and the belting is snugly received in it, as shown in Figs. 3 and 5 of the drawing. The guided cutting operation provides uniform ends for splicing and therefore permits better results to be obtained than would otherwise be obtained. The apparatus is also useful as a clamp for the cemented ends of belts during drying and eliminates the necessity of the provision of other clamping means. The various mechanical means for fastening the parts together, applying pressure to the belt, etc., are illustrative and equivalent means may be employed in lieu of those shown.

I claim:

1. Apparatus of the character described comprising a frame shaped to receive a V belt, means for adjusting the width of said frame, means for retaining a belt therein, and means for receiving and guiding a cutting element to sever said belt.

2. Apparatus of the character described comprising a pair of side members, said members being provided with inclined walls and being adapted to cooperate with each other to form a substantially V shaped trough, means for securing said members to each other, means for clamping a belt within said members, guiding means for guiding a cutting element to sever said belt, and means for adjusting the space between said inclined walls.

3. Apparatus of the character described comprising a pair of members, one of said members having an inclined wall and a bottom portion, the other of said members comprising an inclined side wall and being adapted to cooperate with said first member to form a substantially V shaped trough, means for securing said members to each other, transverse arms pivoted on one of said members, retaining means for said arms carried by the other of said members, and clamping members carried by said transverse arms and adapted to engage a belt arranged in said trough to retain it therein.

4. Apparatus of the character described comprising a pair of members, one of said members having an inclined wall and a bottom portion, the other of said members comprising an inclined side wall and being adapted to cooperate with said first member to form a substantially V shaped trough, means for securing said members to each other, transverse arms pivoted on one of said members, retaining means for said arms carried by the other of said members, and clamping members carried by said transverse arms and adapted to engage a belt arranged in said trough to retain it therein, said inclined side walls being provided with aligned slots for the reception of a cutting member.

GEORGE ARTHUR SCHIEREN.